(12) United States Patent
Imai

(10) Patent No.: US 6,205,283 B1
(45) Date of Patent: *Mar. 20, 2001

(54) IMAGE PROCESSING APPARATUS RESPONSIVE TO SINGLE INPUT FOR IMAGE REPRODUCTION AND PRINTING

(75) Inventor: Kunio Imai, Hachioji (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/730,301

(22) Filed: Oct. 11, 1996

(30) Foreign Application Priority Data

Oct. 17, 1995 (JP) .................................... 7-293344

(51) Int. Cl.[7] ...................................................... H04N 5/76
(52) U.S. Cl. ................................................................ 386/46
(58) Field of Search .............................. 386/1, 8, 46, 4, 386/52–64, 121, 68; H04N 5/76, 5/783

(56) References Cited

U.S. PATENT DOCUMENTS

| | | | |
|---|---|---|---|
| 4,685,003 | * 8/1987 | Westland | 386/52 |
| 4,888,648 | * 12/1989 | Takeuchi et al. | 386/52 |
| 4,920,423 | * 4/1990 | Shiota | 386/52 |
| 5,019,915 | * 5/1991 | Fujito | 386/46 |
| 5,351,154 | * 9/1994 | Yoshioka et al. | 386/121 |
| 5,379,158 | * 1/1995 | Yamagata et al. | 386/121 |
| 5,576,950 | * 11/1996 | Tonomura et al. | 386/121 |
| 5,608,536 | * 3/1997 | Takahashi | 386/46 |
| 5,636,315 | * 6/1997 | Sugiyama et al. | 386/46 |
| 5,689,610 | * 11/1997 | Manico et al. | 386/46 |

* cited by examiner

Primary Examiner—Thai Tran
(74) Attorney, Agent, or Firm—Robin, Blecker & Daley

(57) ABSTRACT

An image processing device comprises a reproducing part for reproducing an image signal from a recording medium, a printing part for printing on a recording material an image relative to the image signal reproduced from the recording medium, and a manual operating member. In response to an operation of the manual operating member, the reproducing part reproduces the image signal from the recording medium and the printing part prints out the image signal reproduced from the recording medium. The image processing device enables contents recorded on the recording medium to be checked by a minimum and simple operation in a short time.

21 Claims, 3 Drawing Sheets

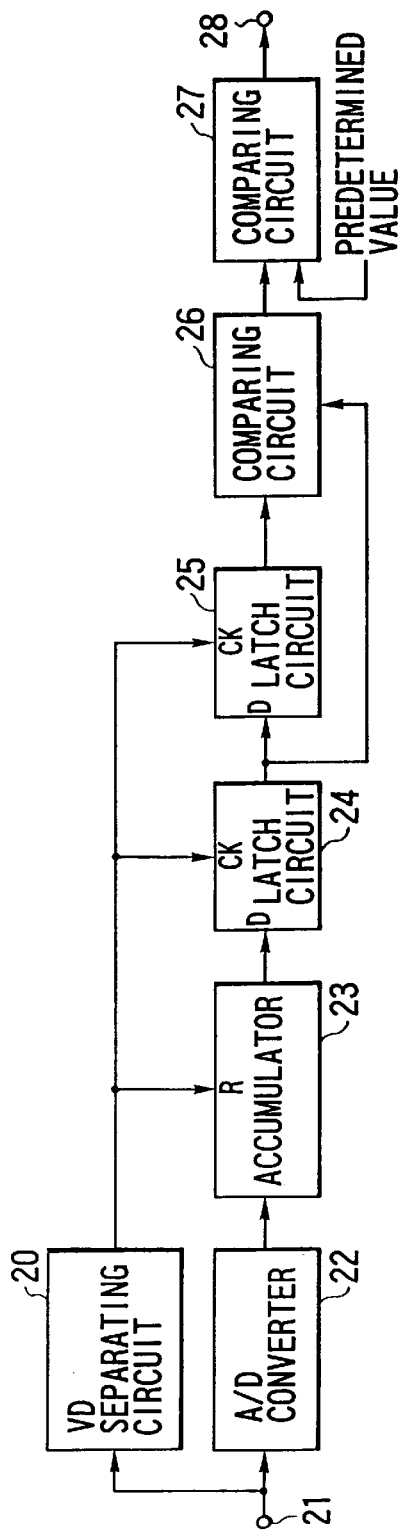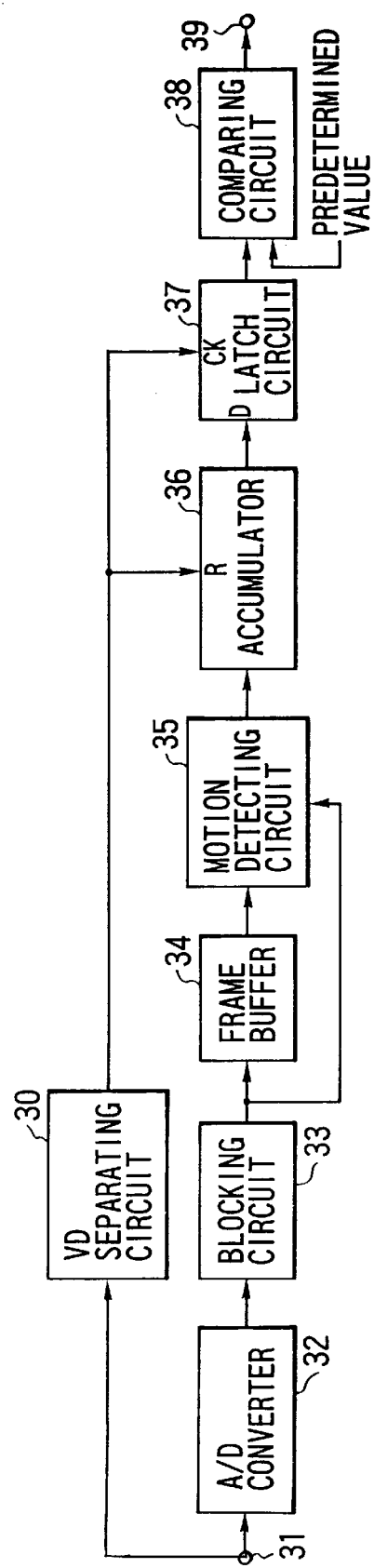

IMAGE PROCESSING APPARATUS RESPONSIVE TO SINGLE INPUT FOR IMAGE REPRODUCTION AND PRINTING

BACKGROUND OF THE INVENTION

1. Field of the Invention

The present invention relates to an image processing device, and, more particularly, to an image processing device having both an image forming function and an image reproducing function for reproducing an image from a recording medium.

2. Description of Related Art

In general, in the case of a moving-image recording device such as a video tape recorder, a video disc device having an image recording function or a laser disc device having an image recording function, it is difficult for users to grasp the contents of moving images of long-previously recorded on a recording medium, so long as the users do not write down the contents.

For example, in the case of a video tape recorder (VTR), if a user is to check all the contents recorded on a video tape, the user needs to perform the extremely time-consuming operation of viewing reproduced video images which are displayed on a display while the video tape is being transported from end to end. To solve such an inconvenience in practice, it has recently been proposed to provide a VTR of the type which is arranged to successively reproduce the leading portion of each program recorded on one video tape and display the contents of the reproduced leading portions. This type of VTR enables a user to check all the programs recorded on the entire video tape in a comparatively short time without reproducing the recorded programs from the video tape from end to end.

However, even in the case of the VTR having such a function, it is necessary to perform such a reproducing operation each time a desired program is to be reproduced. In addition, it takes a considerably long time to transport the video tape for the purpose of reproducing the whole or a table-of-contents portion of the video tape.

Such a time-consuming operation or wasteful time can be omitted if the contents of the programs are noted on paper in advance, instead of performing the aforesaid reproducing operation each time a desired program is to be reproduced. However, in actual situations, users may have no time to make a note of the contents of each program or may find it difficult to do so for various other reasons. In addition, even if a user notes the contents of each program, if the contents themselves are not fully written down, the user may not be able to understand the contents when he/she views the note at a later time.

To cope with these problems, there is a method of printing out representative pictures (a table-of-contents picture) of a plurality of programs displayed on the display, by means of a video printer by utilizing the aforesaid functions of the VTR during recording or reproduction of the video tape, or a method of creating such a table-of-contents picture by means of a personal computer (PC) by employing software having a video capture function and a video-image processing function, and printing out the table-of-contents picture by means of a color printer or the like connected to the PC.

However, the method using the video printer involves a series of operations to be executed in the following sequence: (1) to interconnect the VTR and the video printer via a cable; (2) to turn on the video printer so that the video printer can process a video signal sent from the VTR; (3) to operate the VTR to display the table-of-contents picture on the display; (4) to operate the video printer to input the table-of-contents picture into the video printer; and (5) to operate the video printer to print the input table-of-contents picture.

In the method of printing the table-of-contents picture relative to the video tape by means of the color printer by utilizing the PC, the PC needs to be equipped with the software having the video capture function and the video-image processing function. This method also needs the following operations: (1) to interconnect the output of the VTR to a video input terminal of the PC (the PC and the color printer are connected in advance); (2) to activate the video-image processing software of the PC; (3) to activate the VTR to bring it to a reproduction state; and (4) to operate the PC to successively input the representative pictures of the respective programs and create and print a table-of-contents picture.

As is apparent from the above description, whether the video printer or the PC is used, the aforesaid complicated operation is needed. In addition, since an operation wait time or the like is needed, it still takes a considerably long time to check the contents of the video tape.

BRIEF SUMMARY OF THE INVENTION

It is, therefore, an object of the present invention to solve the above-described problems.

Another object of the present invention is to provide an image processing device which enables the contents recorded on a recording medium to be checked by a minimum and simple operation in a short time.

To achieve the above objects, in accordance with one aspect of the present invention, there is provided an image processing device which comprises reproducing means for reproducing an image signal from a recording medium, printing means for printing on a recording material an image relative to the image signal reproduced from the recording medium, and a manual operating member. In response to an operation of the manual operating member, the reproducing means reproduces the image signal from the recording medium and the printing means prints out the image signal reproduced from the recording medium.

The above and other objects, features and advantages of the present invention will become apparent from the following detailed description of a preferred embodiment of the present invention, taken in conjunction with the accompanying drawings.

BRIEF DESCRIPTION OF THE SEVERAL VIEWS OF THE DRAWING

FIG. 2 is a block diagram showing one specific example of the scene monitoring circuit shown in FIG. 1;

FIG. 3 is a block diagram showing another specific example of the scene monitoring circuit shown in FIG. 1.

DETAILED DESCRIPTION OF THE INVENTION

A preferred embodiment of the present invention will be described below in detail with reference to the accompanying drawings.

Figure 1:
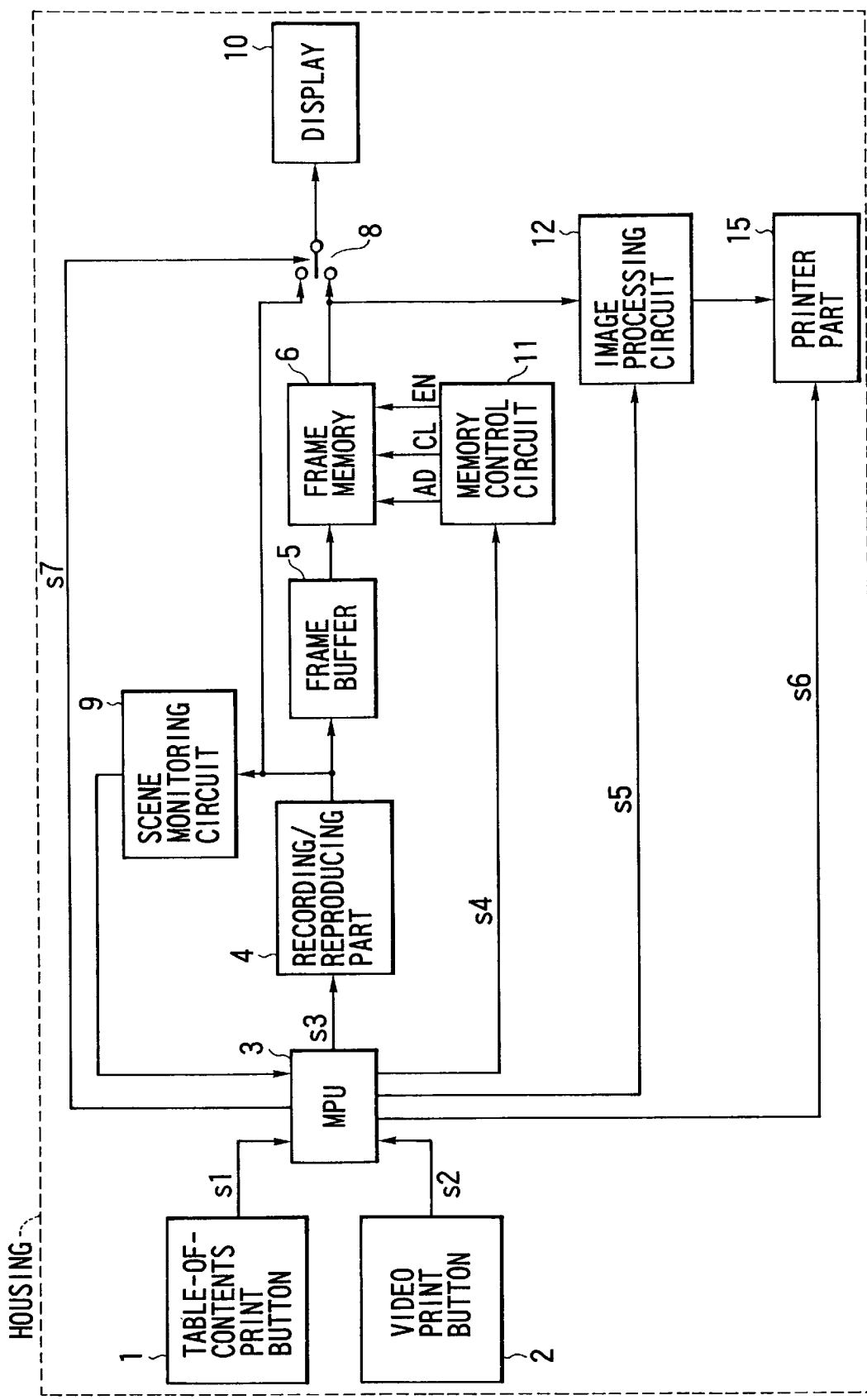
FIG. 1 is a block diagram showing the arrangement of an image processing device according to one embodiment of the present invention.

FIG. 1 is a block diagram showing an image processing device according to the embodiment of the present invention.

The device shown in FIG. 1 is of a type in which a video printer and a video tape recorder are integrally incorporated in a common housing (shown by dashed lines in FIG. 1), and includes a table-of-contents print button 1 through which to input an instruction to print a table-of-contents picture, a video print button 2 through which to input an instruction to print one desired picture, a micro processing unit (MPU) 3 for providing control for making a print of a table-of-contents picture, a desired picture or the like, a recording/reproducing part 4 for performing recording or reproduction of a signal on or from a magnetic tape (video tape) which is not shown, a frame buffer 5 for delaying by a one-frame period a video signal reproduced by the recording/reproducing part 4, a frame memory 6 for storing a video signal for one frame, a switch 8, a scene monitoring circuit 9 for detecting a scene change of a reproduced video signal, a display 10, a memory control circuit 11 for controlling writing of a video signal into the frame memory 6 and reading of a video signal from the frame memory 6, an image processing circuit 12 for converting a video signal read from the frame memory 6 into a signal suitable for printing, and a printer part 15.

In FIG. 1, symbol s1 denotes a control signal to transmit the output of the table-of-contents print button 1 to the MPU 3, symbol s2 denotes a control signal to transmit the output of the video print button 2 to the MPU 3, symbol s3 denotes a signal line via which the MPU 3 controls the recording/reproducing part 4, symbol s4 denotes a signal line via which the MPU 3 controls the memory control circuit 11, symbol s5 denotes a signal line via which the MPU 3 controls the image processing circuit 12, symbol s6 denotes a signal line via which the MPU 3 controls the printer part 15, symbol s7 denotes a signal line via which the MPU 3 controls the switch 8, symbol AD denotes address control data, symbol CL denotes a read or write clock, and symbol EN denotes a write or read enable signal.

In operation, the MPU 3 controls each of the aforesaid parts of the device in response to a print instruction inputted by only one operation of the table-of-contents print button 1, and image signals, each for one picture, of scene change portions respectively corresponding to the leading portions of different recorded programs which have been reproduced from a video tape are reproduced one after another by the recording/reproducing part 4. The reproduced image signals for a plurality of pictures are converted into image signals indicative of reduced versions of the respective pictures, and the image signals indicative of the reduced versions are stored in the frame memory 6 as an image signal for one picture. The thus-stored picture is recorded on a recording material, such as paper, by the printer part 15 which has been made ready to print by the operation of the table-of-contents print button 1.

The operation of the embodiment of the present invention will be described in detail with reference to FIGS. 2 to 4. FIG. 2 is a block diagram showing a specific example of the arrangement of the scene monitoring circuit 9 shown in FIG. 1, FIG. 3 is a block diagram showing another specific example of the arrangement of the scene monitoring circuit 9 shown in FIG. 1, and FIG. 4 is a flowchart aiding in describing the operation of the MPU (micro processing unit) 3 shown in FIG. 1.

Figure 4:
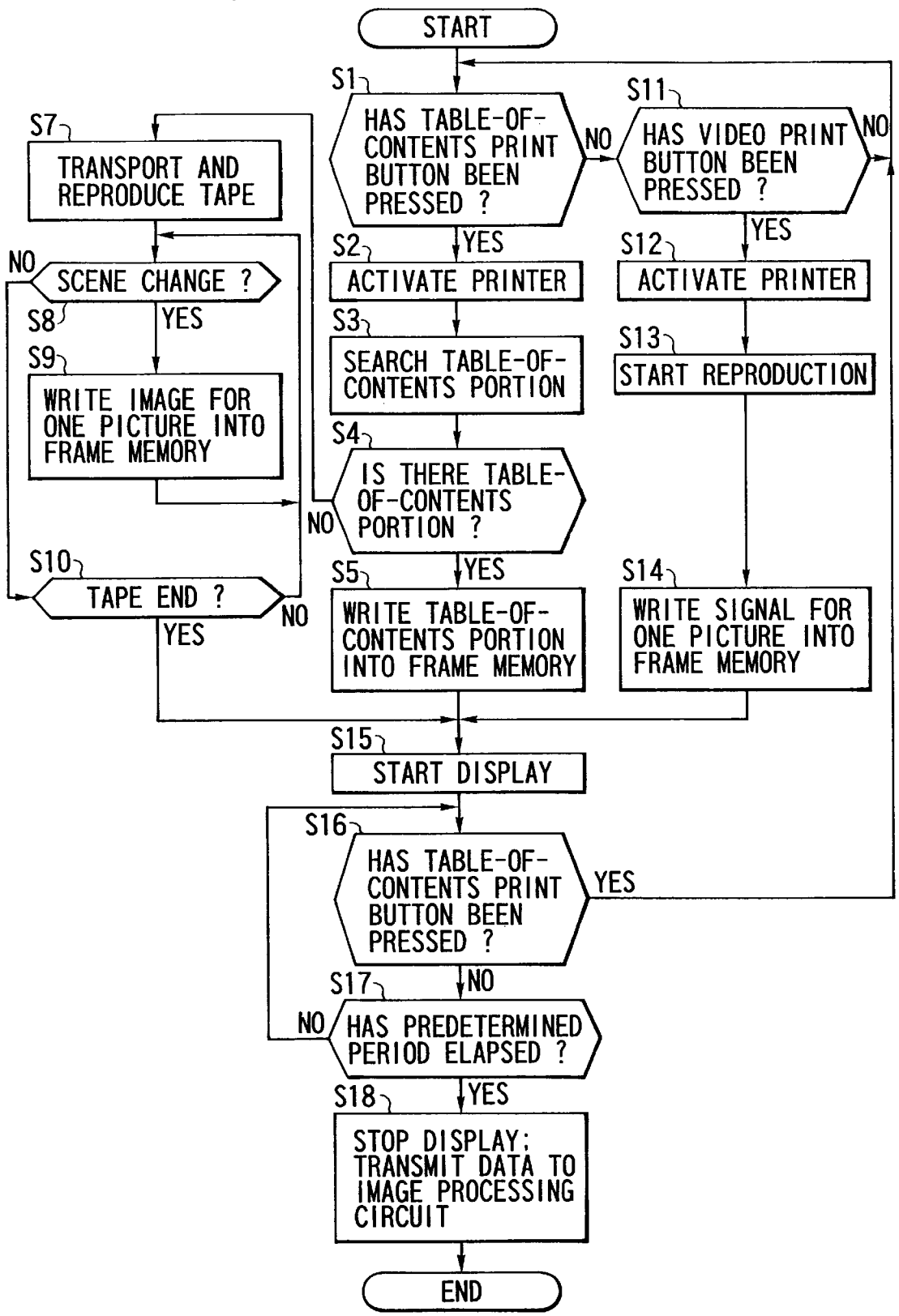
FIG. 4 is a flowchart showing the operation of the MPU (micro processing unit) shown in FIG. 1.

In Step S1 of FIG. 4, if the MPU 3 detects that the table-of-contents print button 1 has been pressed, the MPU 3 controls the printer part 15 via the signal line s6 and activates the printer part 15 to make it ready to print, according to the control signal s1 supplied from the table-of-contents print button 1 (Step S2). Then, the MPU 3 controls the recording/reproducing part 4 and starts the operation of searching a table-of-contents portion (Step S3). Specifically, the MPU 3 controls a capstan (not shown) to transport a tape so that the leading portion of the tape can be reproduced, and starts reproduction from the leading portion.

Since it is possible that a table-of-contents picture is recorded in the table-of-contents portion provided in the leading portion of the tape in the case of a VTR having the aforesaid table-of-contents-picture search function, the MPU 3 first detects whether a table-of-contents picture obtained by reducing and combining a plurality of pictures is recorded in the leading portion of the tape. If the MPU 3 determines that such table-of-contents portion is present in Step S4, the process proceeds to Step S5, in which a signal for one picture, i.e., a table-of-contents picture, recorded in the table-of-contents portion is stored in the frame memory 6 via the frame buffer 5 (Step S5). At this time, the MPU 3 controls the recording/reproducing part 4 via the signal line s3, and also controls the memory control circuit 11 via the signal line s4 to hold the frame memory 6 in a write enable state for a one-frame period and specify a normal clock frequency and a normal address both of which are needed for storing a video signal for one frame in the entire frame memory 6.

In Step S4, if it is determined that a table-of-contents picture is absent, i.e., if a table-of-contents picture is not reproduced even after the tape continues to be transported for a predetermined period, the process proceeds to Step S7, in which the MPU 3 controls the recording/reproducing part 4 to transport the tape and reproduce a moving-image signal recorded on the tape. During this time, it is desirable that the transporting speed of the tape be made as fast as possible within a range in which reproduction of a video signal is possible, for example, approximately several times the transporting speed of the tape for normal recording/reproduction.

The scene monitoring circuit 9 shown in FIG. 1 monitors at all times to detect whether the reproduced moving image contains a scene change portion. In Step S8, the MPU 3 determines from the output of the scene monitoring circuit 9 whether the moving signal which is presently being reproduced indicates a scene change.

Specific examples of the arrangement of the scene monitoring circuit 9 will be described below with reference to FIGS. 2 and 3.

FIG. 2 is a block diagram showing one example of the arrangement of the scene monitoring circuit 9 shown in FIG. 1. If a moving-image signal reproduced by the recording/reproducing part 4 is inputted through a terminal 21, a vertical synchronizing signal (VD) is separated from the moving-image signal by a VD separating circuit 20. Simultaneously, the moving-image signal inputted through the terminal 21 is also supplied to an A/D converter 22, and the A/D converter 22 converts the moving-image signal into digital data indicative of its amplitude value and inputs the digital data to an accumulator 23. The accumulator 23 is reset in synchronism with the VD, and the value accumulated in the accumulator 23 immediately before the resetting is latched by a latch circuit 24 in synchronism with the VD and the latch output of the latch circuit 24 is latched by the next latch circuit 25 in synchronism with the VD.

The output of the accumulator 23 is a value proportional to the accumulated value, i.e., the average value, of the amplitude values of video data for each vertical synchronizing period, the value latched by the latch circuit 24 is a value proportional to the average value of the amplitude values of video data for a vertical synchronizing period immediately previous to the vertical synchronizing period corresponding to the amplitude values inputted to the accumulator 23, and the output of the latch circuit 25 is a value proportional to the average value of the amplitude values of video data for a vertical synchronizing period immediately previous to the vertical synchronizing period corresponding to the value latched by the latch circuit 24. A comparing circuit 26 obtains a difference between the output values of the latch circuit 24 and the latch circuit 25, and the difference is compared with a predetermined value by a comparing circuit 27. If the difference is greater than or equal to the predetermined value, this indicates that a large amplitude variation has occurred in the entire picture over the adjacent vertical synchronizing periods, i.e., a scene change has occurred, and the scene monitoring circuit 9 outputs a scene change detection signal to the MPU 3 via a terminal 28.

FIG. 3 is a block diagram showing another specific example of the arrangement of the scene monitoring circuit 9 shown in FIG. 1. If a moving-image signal reproduced by the recording/reproducing part 4 is inputted through a terminal 31, a vertical synchronizing signal (VD) is separated from the moving-image signal by a VD separating circuit 30. Simultaneously, the moving-image signal inputted through the terminal 31 is also supplied to an A/D converter 32, and the A/D converter 32 converts the moving-image signal into digital data indicative of its amplitude value and inputs the digital data to a blocking circuit 33. The blocking circuit 33 converts the digital data into predetermined blocks each having the number of vertical pixels×the number of horizontal pixels, and outputs the predetermined blocks.

The output of the blocking circuit 33 is inputted to a motion detecting circuit 35 in part via a frame buffer 34 and in part without passing through the frame buffer 34, i.e, blocks which are respectively located at the same position within adjacent pictures are inputted to the motion detecting circuit 35, and the motion detecting circuit 35 detects the presence or absence of a motion for each block. Since it is well known to employ pattern matching or the like to detect a motion on a block-by-block basis, the description of such motion detection is omitted herein. The motion detecting circuit 35 outputs 1-bit data indicative of the presence or absence of a motion for each block, and this 1-bit value is inputted to an accumulator 36. The accumulator 36 is reset in synchronism with the VD, and the value accumulated in the accumulator 36 immediately before the resetting is latched by a latch circuit 37 in synchronism with the VD. This latched value indicates the number of blocks in one picture in each of which a motion is present. In this embodiment, if a multiplicity of blocks, in each of which a motion is present, are present in one picture, it is determined that a scene change has occurred. Specifically, the output value of the latch circuit 37 is compared with a predetermined value by a comparing circuit 38, and if the output value of the latch circuit 37 is greater than or equal to the predetermined value, it is determined that a large motion has occurred between the adjacent pictures, i.e., a scene change has occurred, and the comparing circuit 38 outputs a scene change detection signal to the MPU 3 via a terminal 39.

Referring back to the flowchart of FIG. 4 which shows the operation of the MPU 3, if the MPU 3 determines in Step S8 that the moving-image signal being reproduced corresponds to a scene change portion, a moving image for one picture which is being reproduced is written to the frame memory 6 as a reduced image (Step S9). Specifically, the MPU 3 causes the memory control circuit 11 to supply the write clock CL to the frame memory 6 at a clock rate which is low compared to normal recording. In addition, the MPU 3 causes the memory control circuit 11 to supply the frame memory 6 with the address data AD for specifying an address at which to locate the reduced image, and also to supply the frame memory 6 with the write enable signal EN for the duration of a one-frame period.

The aforesaid operation of writing a reduced image to the frame memory 6 each time a scene change is detected is repeated until it is determined in Step S10 that the tape has been transported up to its tape end, so that a video signal for one picture which contains a plurality of representative pictures of individual recorded programs in the form of their respective reduced images is stored in the frame memory 6.

Upon completion of the writing of the table-of-contents picture to the frame memory 6 by the operation of Steps S9 and S10 or Step S5, the process proceeds to Step S15 even if a user does not perform any operation. In Step S15, the MPU 3 causes the memory control circuit 11 to start reading the stored table-of-contents picture for one picture from the frame memory 6 to the display 10. Specifically, the MPU 3 causes the memory control circuit 11 to supply the read enable signal EN to the frame memory 6 and then supply the normal read clock CL and the address data AD to the frame memory 6, so that the frame memory 6 repeatedly outputs an image signal for one picture at a normal frame rate. During this time, the switch 8 is connected to the output side of the frame memory 6 via the signal line s7.

Thus, display of the table-of-contents picture on the display 10 is started, and this display is continued until it is detected in Step S17 that a predetermined period has elapsed after the start of the display. Owing to the display of the table-of-contents picture for the duration of the predetermined period, the user can automatically check in advance what table-of-contents picture is to be printed out, without the need for any manual operation. At this time, if the table-of-contents picture is a substantially meaningless picture or an image having contents which cannot be grasped, the user can cancel printout of the table-of-contents picture by again pressing the table-of-contents print button 1 during the display of the table-of-contents picture for the duration of the predetermined period. Specifically, if it is detected in Step S16 that the table-of-contents print button 1 has again been operated during the display of the table-of-contents picture for the duration of the predetermined period, the process returns to Step S1 and is placed into the state of waiting for the table-of-contents print button 1 or the like to be again operated.

If the table-of-contents print button 1 is not again operated during the aforesaid display for the duration of the predetermined period, that display is brought to an end, and the table-of-contents picture stored in the frame memory 6 is supplied to the image processing circuit 12 (Step S18). The transmission of table-of-contents picture data to the image processing circuit 12 can be performed at a sufficiently slow speed at a timing synchronized with the printer part 15, since display or the like of the table-of-contents picture is not needed. Specifically, the memory control circuit 11 sets the enable signal EN to be supplied to the frame memory 6 to its read enable level, and generates the read clock CL synchronized with the operation of the printer part 15 and transmits the table-of-contents picture data to the image processing circuit 12.

The image processing circuit 12 converts a video signal, for example an RGB signal, to a YMC signal and simultaneously performs color conversion processing so that optimum color reproduction can be attained at the printer part 15. If the printer part 15 is a two-level printer, such as an ink-jet printer, it is necessary to perform processing such as dither processing or error diffusion processing. Thus, the printer part 15 executes a table-of-contents-picture printing operation.

As is apparent from the above description, according to the device of the present embodiment, formation, display and printing of a table-of-contents picture from a reproduced signal outputted from a reproducing part can be automatically executed by only one operation of the table-of-contents print button 1, and users can obtain the table-of-contents picture on a recording material, such as paper, without substantially performing a complex operation. Accordingly, it is possible to construct a system which is extremely convenient for users. In addition, according to the present embodiment, users can cancel printout of a table-of-contents picture by again operating the table-of-contents print button 1 during the display of the table-of-contents picture for the duration of a predetermined period. Accordingly, in spite of automatic processing, it is possible to solve lack of flexibility which is peculiar to the automatic processing; for example, it is possible to inhibit printout of an unnecessary table-of-contents picture.

It is to be noted that the device of the present embodiment can execute not only printout of a table-of-contents picture but also printout of a desired picture, by an operation of one operating button.

Referring again to the flowchart of FIG. 4, if the video print button 2 is pressed (Step S11), the printer part 15 is activated (Step S12), then the recording/reproducing part 4 starts a reproducing operation (Step S13), and then a reproduced moving-image signal for one picture is inputted to the frame memory 6 (Step S14). Although detailed description is omitted herein, Step S15 and the following steps are completely the same as the above-described table-of-contents-picture printing operation. Accordingly, in the present embodiment, owing to its extremely good operability, even if a desired picture is to be printed out by using a video printer, the user can cancel a printout operation by operating the table-of-contents print button 1 during the display of the desired picture for the duration of the predetermined period.

Although in the description of the present embodiment reference has been made to a device in which a video printer and a VTR are integrally incorporated, it is apparent that the present invention can similarly be applied to other devices, such as a device in which a video printer and a video disc player are integrally incorporated and a device in which a video printer and a laser disc player are integrally incorporated.

As is apparent from the foregoing description, according to the present embodiment, it is possible to realize a device of extremely good operability which can automatically execute all processing for making a printout of a table-of-contents picture or a desired picture by only one operation of a single operating member.

What is claimed is:

1. An image processing device comprising:
   (a) reproducing means for reproducing an image signal from a recording medium;
   (b) memory means for storing the image signal reproduced by said reproducing means;
   (c) printing means for printing on a recording material an image relative to the image signal reproduced from the recording medium;
   (d) a manual operating member; and
   (e) control means for controlling said reproducing means, said memory means and said printing means in response to a single operation of the manual operating member without further operation of the manual operating member, so that said reproducing means reproduces the image signal, said memory means tentatively stores the image signal for one picture and outputs it, said printing means prints the image, and said printing means becomes ready to print before said memory means stores an image signal to be printed.

2. A device according to claim 1, further comprising display means for displaying the image signal for one picture stored in said memory means, said control means controls, also in response to the single operation of the manual operating member, said memory means so that said memory means outputs the stored image signal for one picture to said display means.

3. A device according to claim 2, wherein said control means controls, also in response to the single operation of the manual operating member, said memory means so that said memory means, after having stored the image signal for one picture reproduced by said reproducing means, outputs the stored image signal for one picture to said display means for a predetermined period and, after the predetermined period has elapsed, outputs the stored image signal for one picture to said printing means.

4. A device according to claim 3, wherein while said memory means is outputting the image signal for one picture to said display means, said control means inhibits said memory means from outputting the image signal to said printing means, according to a predetermined instruction.

5. A device according to claim 4, wherein the predetermined instruction is given according to an operation of said manual operating member.

6. A device according to claim 2, wherein said reproducing means is capable of reproducing a moving-image signal from the recording medium, and said control means controls said memory means in response to the single operation of said manual operating member so that said memory means stores the image signal for one picture extracted from the moving-image signal reproduced by said reproducing means.

7. A device according to claim 2, wherein said reproducing means is capable of reproducing a moving-image signal from the recording medium, and said control means controls said memory means in response to the single operation of said manual operating member so that said memory means stores as the image signal for one picture an image signal for a plurality of pictures extracted from the moving-image signal reproduced by said reproducing means.

8. A device according to claim 7, further comprising another manual operating member, and wherein said control means controls said memory means in response to an operation of the other manual operating member so that said memory means stores as the image signal for one picture an image signal for one picture extracted from the moving-image signal reproduced by said reproducing means.

9. A device according to claim 7, further comprising extracting means for extracting the plurality of pictures by successively extracting one picture of a leading part of each recorded program from the moving-image signal reproduced by said reproducing means.

10. A device according to claim 9, wherein said extracting means includes detecting means for detecting a scene change in the moving-image signal.

11. A device according to claim 10, wherein said detecting means detects a difference between adjacent pictures in the moving-image signal.

12. A device according to claim 10, wherein said detecting means divides each of the pictures of the moving-image signal into a plurality of blocks and detects whether a motion has occurred between blocks which are respectively located at the same position within adjacent pictures.

13. A device according to claim 1, wherein said printing means and said reproducing means are incorporated in a common housing.

14. An image processing method comprising the steps of:

(a) reproducing an image signal from a recording medium in response to a single operation of a manual operating member;

(b) without further operation of said manual operating member, storing in a memory the image signal reproduced by said reproducing means in response to reproducing the image signal;

(c) without further operation of said manual operating member, making a printer ready to print before said storing step; and (d) without further operation of said manual operating member, reading the image signal for one picture from the memory in response to completion of said storing step of storing the image signal for one picture in the memory and printing an image relative to the image signal for one picture on a recording material by the printer.

15. A method according to claim 14, further comprising a step of repeatedly reading the image signal for one picture from the memory for a predetermined period in response to a completion of said storing step of storing the image signal for one picture in the memory, in order to display an image relative to the image signal for one picture on a display.

16. A method according to claim 15, wherein said step of reading the image signal for one picture from the memory for a displaying purpose is performed prior to said step of reading the image signal for one picture from the memory for a printing purpose.

17. A method according to claim 14, further comprising a step of extracting one picture, which forms the image signal for one picture, from a moving-image signal reproduced from the recording medium in response to the single operation of the manual operating member without further operation of the manual operating member.

18. A method according to claim 14, further comprising a step of extracting a plurality of pictures, which forms the image signal for a plurality of pictures from a moving-image signal reproduced from the recording medium and processing the image signal in response to the single operation of the manual operating member without further operation of the manual operating member.

19. A method according to claim 18, wherein a step of extracting includes a step of extracting one picture, which forms the image signal for one picture, from a moving-image signal reproduced from the recording medium in response to another operation of the manual operating member.

20. A method according to claim 18, wherein the image signal for the plurality of pictures is extracted by successively extracting one picture of a leading part of each recorded program from the moving-image signal.

21. A method according to claim 18, wherein the image signal for the plurality of pictures is extracted from the moving-image signal in accordance with detection of a scene change in the moving-image signal.

* * * * *